Figure 1:
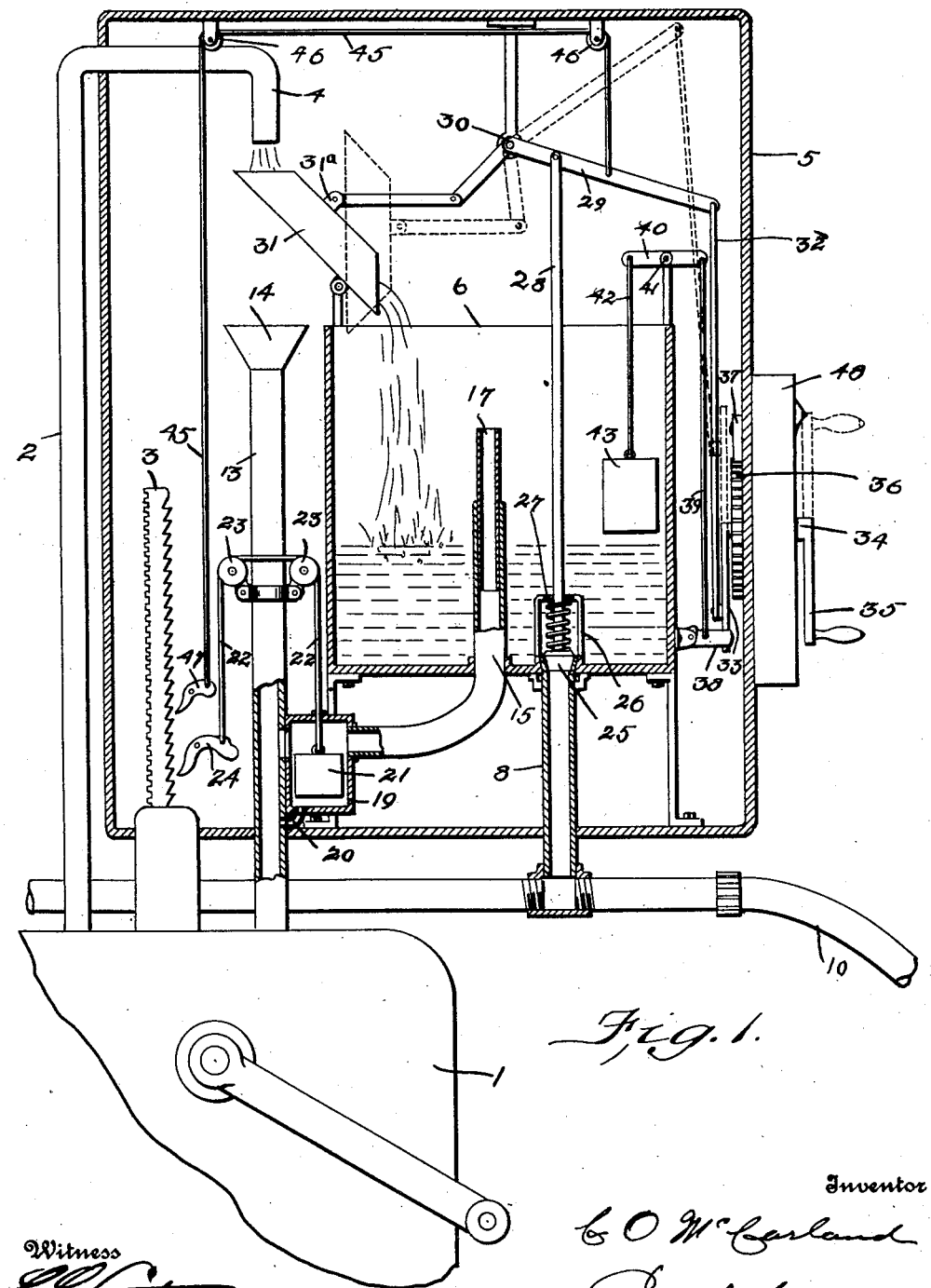

C. O. McCASLAND.
LIQUID DISPENSING MACHINE.
APPLICATION FILED OCT. 10, 1919.

1,347,108. Patented July 20, 1920.
2 SHEETS—SHEET 1.

C. O. McCASLAND.
LIQUID DISPENSING MACHINE.
APPLICATION FILED OCT. 10, 1919.
1,347,108.
Patented July 20, 1920.
2 SHEETS—SHEET 2.
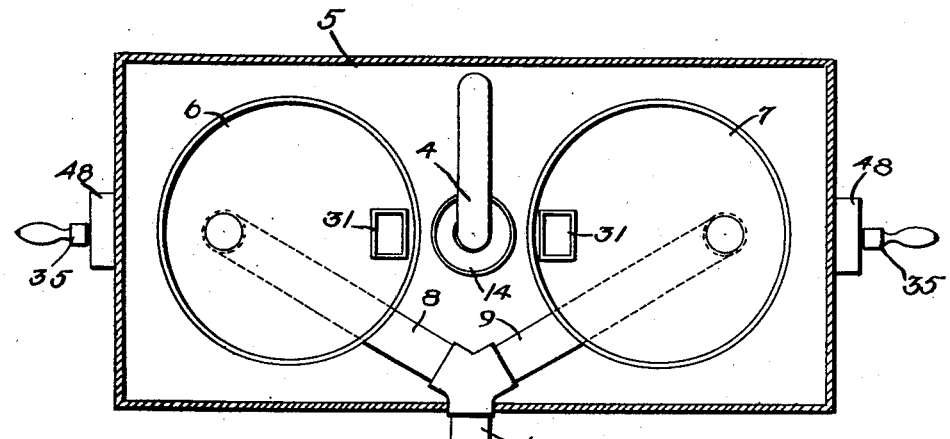
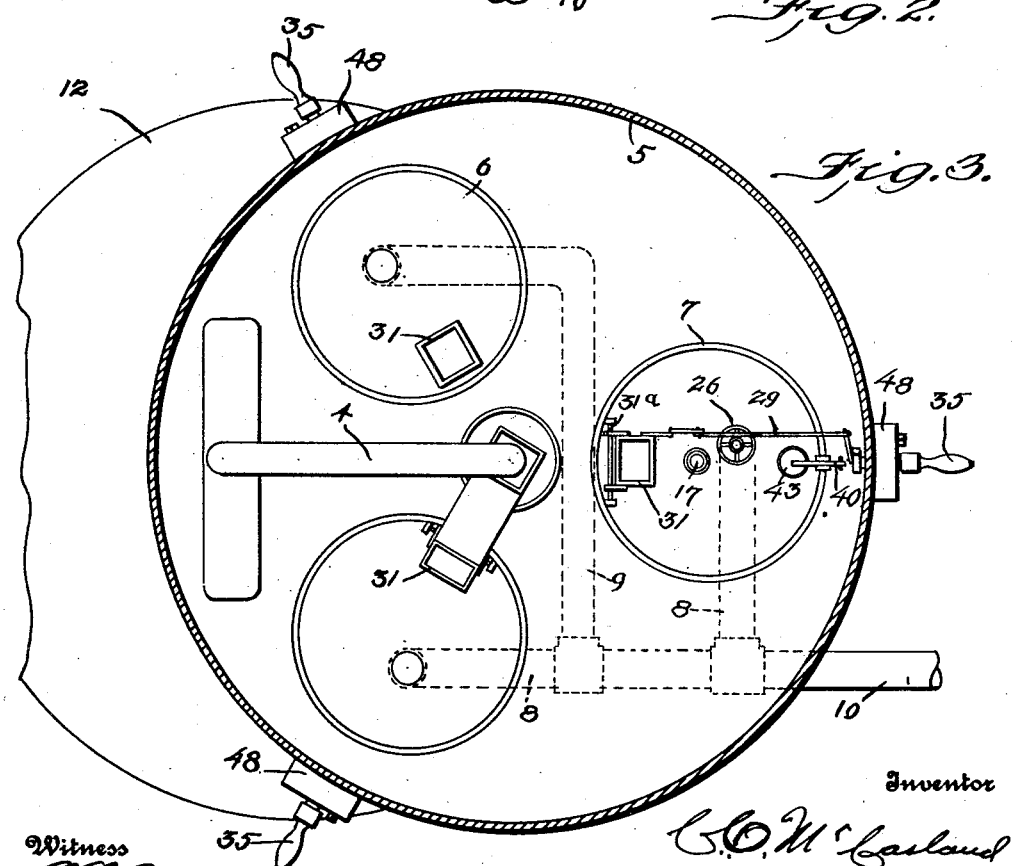

UNITED STATES PATENT OFFICE.

CHARLES O. McCASLAND, OF ST. LOUIS, MISSOURI.

LIQUID-DISPENSING MACHINE.

1,347,108.  Specification of Letters Patent.  Patented July 20, 1920.

Application filed October 10, 1919. Serial No. 329,674.

*To all whom it may concern:*

Be it known that I, CHARLES O. McCASLAND, a citizen of the United States, residing at St. Louis, in the county of St. Louis and State of Missouri, have invented certain new and useful Improvements in Liquid-Dispensing Machines, of which the following is a specification.

The object of my invention is to provide a liquid dispensing machine which may be placed in convenient positions along a roadway for dispensing gasolene, oil, and the like, and which may be operated by the purchaser of gasolene upon the deposit in said machine of a prescribed amount of money per gallon; a further object of my invention is to dispense with the service of a regular attendant and have the machine free to be operated to dispense gas and the like at all hours of the day and night.

A further object of my invention is to provide a machine of this character containing two or more measuring tanks, each provided with a coin controlled mechanism and each provided with an outlet valve and a supply conduit and means to operate said conduit and valve substantially simultaneously whereby the valve is closed while a tank is being filled and whereby the supply to the tank is cut off when the valve is open; and with these and other objects in view my invention consists of the parts and combination of parts as will be hereinafter specified.

In the drawings:

The reference numeral 1 designates a pump of any suitable construction having an outlet pipe 2 and a rack bar 3, the pipe having its discharge end 4 positioned within a housing 5 of suitable construction and preferably closed on all sides.

In the housing 5 I locate a plurality of measuring tanks 6, 7 which have outlet or discharge pipes 8, 9 which empty into a common discharge pipe 10 to which the usual flexible dispensing hose 11 is connected, through which gasolene, oil and the like is delivered to a tank in an automobile or motor vehicle.

The pump 1 is, of course, connected with an underground supply tank 12 of the usual type. An overflow pipe 13 connected at its lower end with the underground tank 12 extends upward into the housing 5 and terminates at its upper end in a funnel shape portion 14 which is positioned directly in the line of discharge of the liquid from the spout 4 of the pump, so that if the flow of the liquid from the pump discharge 4 is not interrupted the liquid will be returned to the underground tank through the return pipe 13 as will be understood from the drawing. The measuring tanks 6, 7, are each provided with an overflow pipe 15, each provided with an extensible member 17, whereby the weight, or quantity of liquid in said tank may be controlled so that a predetermined amount of liquid may be delivered from said tanks for a predetermined price. The over flow pipes 15, 16 are connected at their lower ends to the return pipe 13, and are provided, near the pipe 13 with a float chamber 19, having a by-pass 20 in open communication with the return pipe 13 to slowly drain said float channels. A float 21 is positioned in the float chamber 19 to which is secured one end of a cable 22, which passes over suitable sheaves 23. The other end of the cable 22 is secured to one end of a pawl, 24 which pawl is suitably pivoted and is adapted to engage the rack bar 3. The pawl, is, as will be seen from the drawing, counterweighted, so that normally it remains out of engagement with the rack bar, but adapted to be moved into engagement with the rack bar when the float 21 is elevated by liquid in the chamber 19 whereby further upward movement of the rack bar is prevented and consequently the action of the pump is arrested.

The limitation of the amount of liquid the customer gets does not depend upon the operation of the dog 24 by the float 21, but rather upon the fact that the measures will overflow faster than the liquid can be pumped whenever they are full to the top of the adjustable overflow pipe. In fact the dog 24 may be dispensed with and any suitable signal employed to notify the customer that he has pumped as much as he can get for his coin.

Each of the measuring tanks, 6, 7, is provided with a suitable outlet valve or other means adapted to close the outlet of the tanks, that shown 25 having a sleeve 26 in which is suitably mounted a coiled or other spring 27 to which the lower end of the pitman rod 28 is secured, the upper end of the pitman rod being pivotally secured to a lever 29 which is pivoted at 30, the free end of the lever 29 being deflected downward at an angle to the rest of the lever to which is suitable secured (preferably pivotally) the spout or conduit 31, which is adapted to be moved, on its pivot 31ª by said lever, as will be hereinafter described, into the path of the flow of liquid from the discharge 4 of the pump.

A rod 32 is pivotally connected to one end of the lever 29 and at its other end is connected with a crank 33, said crank having an axle 34 and a crank handle 35. 36 is a ratchet wheel secured on the axle 34 and 37 is a pawl or dog coöperating with said ratchet wheel to prevent the crank from being turned but in one direction.

To prevent the unauthorized operation of the device I provide a coin, or other lock mechanism which controls the revolution of the crank handle 35, and the operation of its associated parts. For one tank I provide a coin lock which may be operated upon the insertion of a prescribed token, say a 25 cent piece, and on the other tanks I provide coin locks which may be operated upon the insertion of coins or tokens of different value, all of which will be understood by those skilled in the art. I do not illustrate any details of the coin lock, or its locking engagement with the shaft 34, because any of the well known coin mechanisms may be employed by the skilled mechanic.

To limit the initial or setting movement of the crank and its associated parts, I provide a stop 38 pivotally mounted at one end and adapted to be positioned, normally, by the parts to be hereinafter described, in the path of the rod 32, or if desired in the path of the crank 33, so that the crank handle 35 may be revolved but one half of its revolution. These parts are the pawl 38 to which is secured one end of a cable or chain 39, the other end of the cable 39 being secured to one end of the arm or lever 40, pivoted at 41. A cable is secured to the other end of the lever 40 to which cord or cable 42 a float 43 is connected, said float being positioned in the measuring tank 6. It will be understood that while I have described the various parts of the mechanism as being in the tank 6 that a duplicate of these mechanisms is positioned in each of the other measuring tanks.

When the measuring tank is empty the float 43 is in its lowermost position, consequently the pawl 38 is in the position shown and in the path of the movement of the lower end of the rod 32 thereby limiting the preliminary movement of the crank handle 35 to one half of its revolution. Of course when the measuring tank is full of liquid the float 43 rises thereby lowering the pawl 38 and permitting the crank handle 35 to complete its full revolution. The parts are positioned within the housing 5, with the exception of the crank handle 35, the pump and part of the supply pipe 2.

The spouts, or conduits 31, of all of the measuring tanks are to be arranged to intercept the flow of liquid from one single supply pipe discharge 4; for example, when a twenty five cent piece is inserted in a lock, the spout for the twenty five cent measuring tank is positioned to intercept the flow of liquid from the pump and direct it into the twenty five cent tank, and when a fifty cent piece is inserted in a lock the spout for the fifty cent tank is positioned to direct the flow of liquid in that tank. But unless some spout intercepts the flow of liquid from the discharge 4 of the pump, the liquid will return through the pipe 13 into the underground tank 12.

Upon the deposit of a coin of prescribed value in one of the locks the associated crank handle 35 becomes free to be revolved and is stopped at one half revolution by the pawl 38. This movement of the crank pulls the rod 32 downward, which movement is communicated to the lever 29 which in turn moves the spout 31 to a position immediately under the discharge 4 of the pump.

When the lever 29 is thus moved it pulls on the cable 45 mounted on the sheaves 46, thereby releasing the counter-weighted dog 47 from its normal engagement with the rack bar 3 of the pump, whereupon the pump is free to be operated in the usual manner and discharge the liquid from the discharge spout 4 from which it passes into the spout or conduit 31, and thence into the measuring tank 6, but as soon as the liquid reaches the top of the overflow pipe 17 it spills into said pipe and flows to the float chamber 19, thereby operating the float 21 which relieves the tension on the cable 22 and permits the dog 24 to drop into engagement with the rack bar of the pump, thereby preventing any further pumping action. At this stage of the operation the float 43 has ascended, thereby rocking the arm 40 and lowering the pawl 38, whereby the crank handle 35 is now free to complete its revolution and in the completion of its revolution the rod 32 is elevated and the lever 29 rocked on its pivot 30 which lifts the rod 28 and the valve 25 connected thereto to permit the flow of the liquid through the outlet pipes 8, 9 or 10. The upward movement of the lever 29 relieves the tension on the cable 45 whereby the pawl or dog 47 is permitted to move into engagement with the rack 3 of the pump, thereby locking the pump against further action.

The dog 47 may also be dispensed with without departing from my invention or reducing the efficiency of the device because after the customer has once turned the crank into the second full revolution, sufficiently to open the valve 25, he will have removed the conduit 31 from the path of the flow of the liquid, and the ratchet on the crank will prevent him from reversing it: besides which the coin mechanism will stop the crank at the end of the complete revolution. The dog 47 is mainly to keep idlers from operating the pump.

The seepage of the liquid from the float chamber 19 through the by-pass pipe 20 permits the float 21 to move downward thereby relieving the tension on the cable 22, whereupon the pawl 24 is free to disengage itself from the rack bar 3 of the pump.

The function of the spring 27 of the valve 25 is as follows: The expansion of the spring 27 is such that it will not exert a pull on the valve 25 until the spout or conduit 31 is removed from its position under the discharge 4 of the pump, so that there is no danger of surplus of liquid being emptied into the discharge from the measuring tanks.

The operation of filling and emptying the measuring tanks may be repeated as often as the prescribed coin or token is deposited in the lock 48.

In the drawings:

I have shown the measuring tanks in groups of two and three, all having a common discharge pipe, but it will be understood that the number of measuring tanks is optional and that if found desirable each measuring tank may have an independent discharge pipe.

Many other changes may be made within the scope of the appended claims without departing from the spirit of my invention.

I prefer to have one pump for each group of measuring tanks and also to have a separate crank for each coin slot.

What I claim is:—

1. In a liquid dispensing device, the combination of a plurality of measuring tanks of different capacity, a discharge common to said tanks, a pump common to all of said tanks, conduits from said pump to said tanks, normally out of the path of flow of liquid from the pump, and means to select and move one of said conduits into the path of the flow of the liquid from the pump and over a predetermined tank.

2. In a liquid dispensing device, the combination of a measuring tank, a supply tank, a pump connected with said supply tank, a return pipe to said supply tank, the upper end of which is directly in line with the outlet of the pump, a conduit normally out of line with the discharge outlet of the pump, mechanism to move said conduit into line with the discharge outlet of the pump and direct the flow of liquid from the pump into the measuring tank, and a lock controlling the movement of said conduit.

3. In a liquid dispensing device, the combination of a measuring tank, a supply tank, a pump connected with said supply tank, a return pipe to said supply tank in line with the outlet of said pump, a conduit normally out of line with the discharge outlet of the pump, means to move said conduit into line with the pump discharge and direct the flow of liquid from said pump into said tank, a lock controlling the movement of said conduit, and means locking the pump against further pumping operation after a predetermined amount of liquid has been delivered in a single operation of the pump.

4. In a liquid dispensing device, the combination of a measuring tank, a supply tank, a pump connected with said supply tank, a return pipe to said supply tank, the upper end of which is open and directly in line with the discharge of the pump, an overflow in said measuring tank in communication with said return pipe, a conduit normally out of line with the pump discharge, mechanism to move said conduit in line with the pump discharge and direct the liquid from the pump into said measuring tank, and means preventing unauthorized operation of said mechanism.

5. In a liquid dispensing device, the combination of a measuring tank, a supply tank, a pump connected with said supply tank, a return pipe to said supply tank, the upper end of which is open and directly in line with the discharge of the pump, an overflow in said measuring tank in communication with said return pipe, means in said overflow pipe limiting the movement of the pump, a conduit normally out of line with the pump discharge, mechanism to move said conduit in line with the pump discharge and direct the liquid from the pump into the measuring tank, and means preventing the unauthorized operation of said mechanism.

6. In a liquid dispensing device, the combination with a supply tank, a pump connected with said tank, a measuring tank, an overflow pipe in said measuring tank connected with the supply tank, a conduit for delivering liquid from said pump to said measuring tank but normally in inoperative position for such purpose, an outlet delivery control or valve for said measuring tank, means for substantially simultaneously moving said control or valve to closed position and said conduit to operative position, whereby liquid is directed to and measured in said measuring tank, and means preventing unauthorized operation of the device whereby only a predetermined amount of liquid can be dispensed in a single operation of the device.

7. In a liquid dispensing device, the combination with a supply tank, a pump connected with said tank, a measuring tank, an adjustable overflow pipe in said measuring tank controlling the amount of liquid to be dispensed from said tank and connected with the supply tank, a spout for delivering liquid from said pump to the measuring tank but normally in inoperative position for such purpose, an outlet delivery control or valve for said measuring tank, means for substantially simultaneously moving said control or valve to closed position and moving said spout to operative position, whereby liquid is directed to and measured in said measuring tank, and means preventing unauthorized operation of the device whereby only a predetermined amount of liquid can be dispensed in a single operation of the device.

8. In a device of the character described, the combination with a pump, a measuring tank, a movable spout to direct liquid from the pump to the measuring tank but normally out of position for such purpose, means for moving the spout to operative position, a ratchet bar connected with said pump, a counterweighted pawl adapted to normally engage said bar, and means operable when the spout is moved to operative position to disengage the pawl from said ratchet bar.

In testimony whereof I affix my signature.

CHARLES O. McCASLAND.